United States Patent
Savage et al.

(10) Patent No.: US 9,154,388 B2
(45) Date of Patent: *Oct. 6, 2015

(54) DATA DELIVERY

(71) Applicant: Google Inc., Mountain View, CA (US)

(72) Inventors: Jesse Savage, Redwood City, CA (US);
Brian N. Kuhn, Lake Forest, CA (US);
James L. Wogulis, Laguna Beach, CA (US)

(73) Assignee: Google Inc., Mountain View, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 13/840,100

(22) Filed: Mar. 15, 2013

(65) Prior Publication Data

US 2013/0204932 A1    Aug. 8, 2013

Related U.S. Application Data

(63) Continuation of application No. 12/938,781, filed on Nov. 3, 2010, now Pat. No. 8,452,837.

(51) Int. Cl.
*G06F 15/16* (2006.01)
*H04L 12/26* (2006.01)
(Continued)

(52) U.S. Cl.
CPC ............ *H04L 43/04* (2013.01); *G06Q 10/0637* (2013.01); *G06Q 50/30* (2013.01)

(58) Field of Classification Search
CPC ......... H04L 43/16; H04L 43/04; H04L 12/66; G06F 15/16; G06F 17/30256
USPC .............. 709/203, 224; 705/40; 370/232, 252
See application file for complete search history.

(56) References Cited

U.S. PATENT DOCUMENTS 6,731,625 B1    5/2004    Eastep et al.
7,328,435 B2    2/2008    Trifon
(Continued)

FOREIGN PATENT DOCUMENTS

CN    1262836    8/2000
CN    101454764    6/2009
CN    101615179    12/2009

OTHER PUBLICATIONS

Ranganathan, A. 'Cross-site xmlhttprequest with CORS'. Mozilla Hacks.Mozilla.org [online]. Jul. 6, 2009. [retrieved on Aug. 10, 2011]. Retrieved from the Internet electronic mail: http://hacks.mozilla.org/2009/07/cross-site-xmlhttprequest-with-cors/.

(Continued)

*Primary Examiner* — Tesfay Yohannes
(74) *Attorney, Agent, or Firm* — Fish & Richardson P.C.

(57) ABSTRACT

Methods, systems, and apparatus, including computer programs encoded on a computer storage medium, for support dependent post delivery. In one aspect, a method included generating transmission data for a web page served by a first server and rendered on the client device, the first server belonging to a first domain; determining if the client device supports cross origin resource sharing; in response to a determination that the client device does not support cross origin resource sharing: defining an iFrame for the web page, the iFrame belonging to a second domain of a receiving server, and having a name value derived from the transmission data, receiving iFrame instructions from the receiving server and executing the iFrame instructions in the iFrame, the iFrame instruction causing the client device to: generate an HTTP POST request to the receiving server from the iFrame name value, the first HTTP POST request including the transmission data.

17 Claims, 4 Drawing Sheets

(51) Int. Cl.
*G06Q 10/06* (2012.01)
*G06Q 50/30* (2012.01)

(56) References Cited

U.S. PATENT DOCUMENTS

| | | | |
|---|---|---|---|
| 7,624,084 B2 | 11/2009 | Chesla | |
| 8,135,610 B1 | 3/2012 | Bryce et al. | |
| 8,290,980 B2 | 10/2012 | Baio et al. | |
| 8,321,269 B2 | 11/2012 | Linden et al. | |
| 2002/0177448 A1* | 11/2002 | Moran et al. | 455/456 |
| 2003/0023628 A1* | 1/2003 | Girardot et al. | 707/513 |
| 2003/0187832 A1* | 10/2003 | Reader | 707/3 |
| 2004/0249751 A1* | 12/2004 | Luttge | 705/40 |
| 2005/0182843 A1 | 8/2005 | Reistad et al. | |
| 2006/0080327 A1* | 4/2006 | Gramling et al. | 707/100 |
| 2006/0136294 A1 | 6/2006 | Linden et al. | |
| 2007/0204259 A1* | 8/2007 | Wilner et al. | 717/124 |
| 2007/0250618 A1 | 10/2007 | Hammond | |
| 2008/0065599 A1 | 3/2008 | Baio et al. | |
| 2009/0099503 A1* | 4/2009 | Mitsuda | 604/25 |
| 2009/0109959 A1 | 4/2009 | Elliott et al. | |
| 2009/0245122 A1 | 10/2009 | Maiocco et al. | |
| 2009/0327421 A1 | 12/2009 | Fu et al. | |
| 2010/0281107 A1* | 11/2010 | Fallows et al. | 709/203 |
| 2010/0281178 A1 | 11/2010 | Sullivan | |
| 2011/0213655 A1 | 9/2011 | Henkin et al. | |
| 2012/0023153 A1* | 1/2012 | Karasaridis | 709/203 |
| 2013/0031462 A1* | 1/2013 | Calvo et al. | 715/234 |
| 2013/0318627 A1* | 11/2013 | Lundkvist et al. | 726/27 |

OTHER PUBLICATIONS

'Hypertext Mark Language—2.0—Forms' [online]. [retrieved on Aug. 10, 2011]. Retrieved from the Internet electronic mail: http://www.w3.org/MarkUp/html-spec/html-spec_8.html#SEC8.2.1.

'Hypertext Transfer Protocol'. Wikipedia, The Free Encyclopedia [online]. This page was last modified on Aug. 7, 2011. [retrieved on Aug. 10, 2011] Retrieved from the Internet electronic mail: http://en.wikipedia.org/wiki/HTTP_GET#Request_methods.

'Post (HTTP)'. Wikipedia, The Free Encyclopedia [online]. This page was last modified on Jun. 29, 2011 [retrieved on Aug. 10, 2011]. Retrieved from the Internet electronic mail: http://en.wikipedia.org/wiki/HTTP_POST.

'Cross-Origin Resource Sharing'. Wikipedia, The Free Encyclopedia [online]. This page was last modified on Aug. 9, 2011 [retrieved on Aug. 10, 2011]. Retrieved from the Internet electronic mail: http://en.wikipedia.org/wiki/Cross-Origin_Resource_Sharing.

International Search Report and the Written Opinion of the International Searching Authority, or the Declaration for PCT/US2011/058704 dated May 31, 2012, 8 pages.

Office Action issued in Chinese Application No. 201180061249.8 on Mar. 27, 2015, 9 pages (with English translation).

* cited by examiner

DATA DELIVERY

CROSS REFERENCE TO RELATED APPLICATIONS

This application is a continuation application of and claims priority to U.S. application Ser. No. 12/938,781, filed on Nov. 3, 2010 entitled "DATA DELIVERY." The disclosure of the foregoing application is incorporated herein by reference in its entirety.

BACKGROUND

This specification relates to data transmission.

Data transmission is used to communicate between two or more computers connected to a network. One example use of data delivery is in the field of web site analytics. A publisher is an entity that owns and/or manages a web site. Using analytical services offered by third parties, the publisher can monitor analytical data related to user visits and links to the web site. Example analytical data includes data related to domains and/or web sites from which visitors arrived and to which the visitors departed; traffic patterns, e.g., navigation clicks of visitors within the publisher's web site; visitor actions, e.g., purchases, filling out of forms, etc., and other actions that a visitor may take in relation to the publisher's web site. The analysis of such analytical data can inform the publisher of how the visitors were referred to the publisher's web site, whether an advertising campaign resulted in the referral, and how the visitors interacted with the publisher's web site. With this understanding, the publisher can implement changes to increase revenue generation and/or improve the visitor experience. For example, a publisher can focus marketing resources on advertising campaigns, review referrals from other web sites, identify other publishers as potential partners for cross-linking, and so on.

One example analytical system that provides analytical tools that facilitate the collection and analysis of such analytical data is provided by Google™ Analytics, available from Google, Inc., in Mountain View, Calif. To use such systems, a publisher typically provides tracking instructions embedded in its web pages (or, alternatively, provides code in its web page that requests the tracking instructions from an analytics server). Typically, the tracking instructions is a snippet of JavaScript™ code that the publisher adds onto every page of their web site for which traffic is to be tracked. When the page is rendered by a user device, the tracking instructions is executed, collects visitor data and sends it back to the analytics server in the form of a tracking data communication for processing. One common method of sending the tracking data communication is to send it as part of an HTTP request.

The collection of tracking data is also referred to as a tracking beacon. Example tracking data includes account identifier that identifies an analytics account of the publisher, a visitor identifier that identifies the visitor, and event statistics, such as whether the visitor has been to the web site before, the timestamp of the current visit, etc.

The amount and types of events that are reported in the tracking data can be specified by the publisher, e.g., to account for particular information that a publisher wishes to track. However, there is an upper limit on the size of the tracking data communication, as the HTTP GET request has a limit as to the amount of information that can be sent. One way to be able to send greater amounts of tracking data than can be sent by an HTTP GET is to utilize an HTTP POST.

An HTTP POST can be sent either as part of an html form or as part of an asynchronous JavaScript (AJAX) request. An HTTP POST sent as part of an html form adds an entry to the history of some browsers. This may potentially degrade the user experience, as the added entry to the history will cause the backwards button in a browser to produce unexpected results in response to a user's click.

Sending the tracking data as part of an HTTP POST using AJAX is subject to same origin policies of browsers. Many web browsers have protections built into them that prevent a web page or application running originating from one domain from accessing methods and properties from another domain. Because the web page that is being tracked originates from a publisher domain that is different from the domain of the analytics server, the JavaScript running on the web page of the publisher domain may not be able to send the HTTP POST to the analytics server.

Finally, cross origin resource sharing (CORS) does allow for the sending of AJAX post request across a domain boundary. However, many browsers do not support cross origin resource sharing.

SUMMARY

This specification describes technologies relating support dependent post delivery, and more specifically to the transmission of tracking data using a support dependent post delivery process.

In general, one innovative aspect of the subject matter described in this specification can be embodied in methods that include the actions of generating event data detailing one or more events for a web page served by a publisher server and rendered on the client device, the web page and the publisher sever belonging to a first domain, and the one or more events measured relative to the client device; determining if the event data exceeds a size threshold; in response to determining that the event data does not exceed the size threshold, generating an HTTP GET request to an analytics server belonging to a second domain that is different from the first domain, the HTTP GET request including the event data; in response to determining that the event exceeds the size threshold, determining if the client supports cross origin resource sharing; in response to determining that the client supports cross origin resource sharing, generating a first HTTP POST request to the analytics server, the first HTTP POST request including the event data and being a cross origin resource sharing compliant message; and in response to determining that the client does not support cross origin resource sharing generating a second HTTP POST to the analytics server, the second HTTP POST including the event data and being sent from an environment on the client device that belongs to the second domain. Other embodiments of this aspect include corresponding systems, apparatus, and computer programs, configured to perform the actions of the methods, encoded on computer storage devices.

Another innovative aspect of the subject matter described in this specification can be embodied in methods that include the actions of generating event data detailing one or more events for a web page served by a publisher server and rendered on the client device, the web page and the publisher sever belonging to a first domain, and the one or more events measured relative to the client device; determining if the client device supports cross origin resource sharing; in response to a determination that the client device does not support cross origin resource sharing: defining an iFrame for the web page, the iFrame belonging to a second domain of an analytics server, and the iFrame having a name value derived from the event data; issuing a request from the iFrame for environment instructions from the analytics server; receiving the environment instructions from the analytics server and executing the environment instructions in the iFrame, the environment instruction causing the client device to: generate a first HTTP POST request to the analytics server from the iFrame name value, the first HTTP POST request including the event data, and change the domain of the iFrame from the second domain to the first domain. Other embodiments of this aspect include corresponding systems, apparatus, and computer programs, configured to perform the actions of the methods, encoded on computer storage devices.

In another implementation, the rendering of a web page with instructions for sending tracking information causes the computer device to request a second web page. The second web page sends the tracking information to a previously denoted server.

Particular embodiments of the subject matter described in this specification can be implemented so as to realize one or more of the following advantages. Publishers are provided tracking code that is browser-independent with respect to the communication capabilities of the browser. Larger amounts of tracked data can be sent to an analytics third party in a single message than by use of a HTTP get message, i.e., publishers have the ability to track more events with only a single message than and be tracked by using a single HTTP get message.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

A publisher web page that includes tracking instructions is rendered on a client device. During the rending of the web page, the tracking instructions instruct the client device to collect visitor data and send the data to an analytics server. The publisher web page originates from a domain that is different from the domain of the analytics server.

In some implementations, the tracking instructions include instructions that cause the client device to determine whether the tracking data is too large to be sent as part of an HTTP GET request. If the tracking data is not too large to be sent by an HTTP GET request, the client device sends the tracking data to the analytics server by an HTTP GET request. However, if the tracking data is too large to send by an HTTP GET request, the client device determines a support capability of the browser running on the client device, i.e., the client device determines whether the browser supports a cross origin support compliant request. If the browser does support the cross origin support compliant request, then the client sends the tracking data using an HTTP POST using a cross origin support compliant request. Conversely, if the browser does not support the cross origin support compliant request, then the client sends the request from a separate web page instance.

Figure 1:
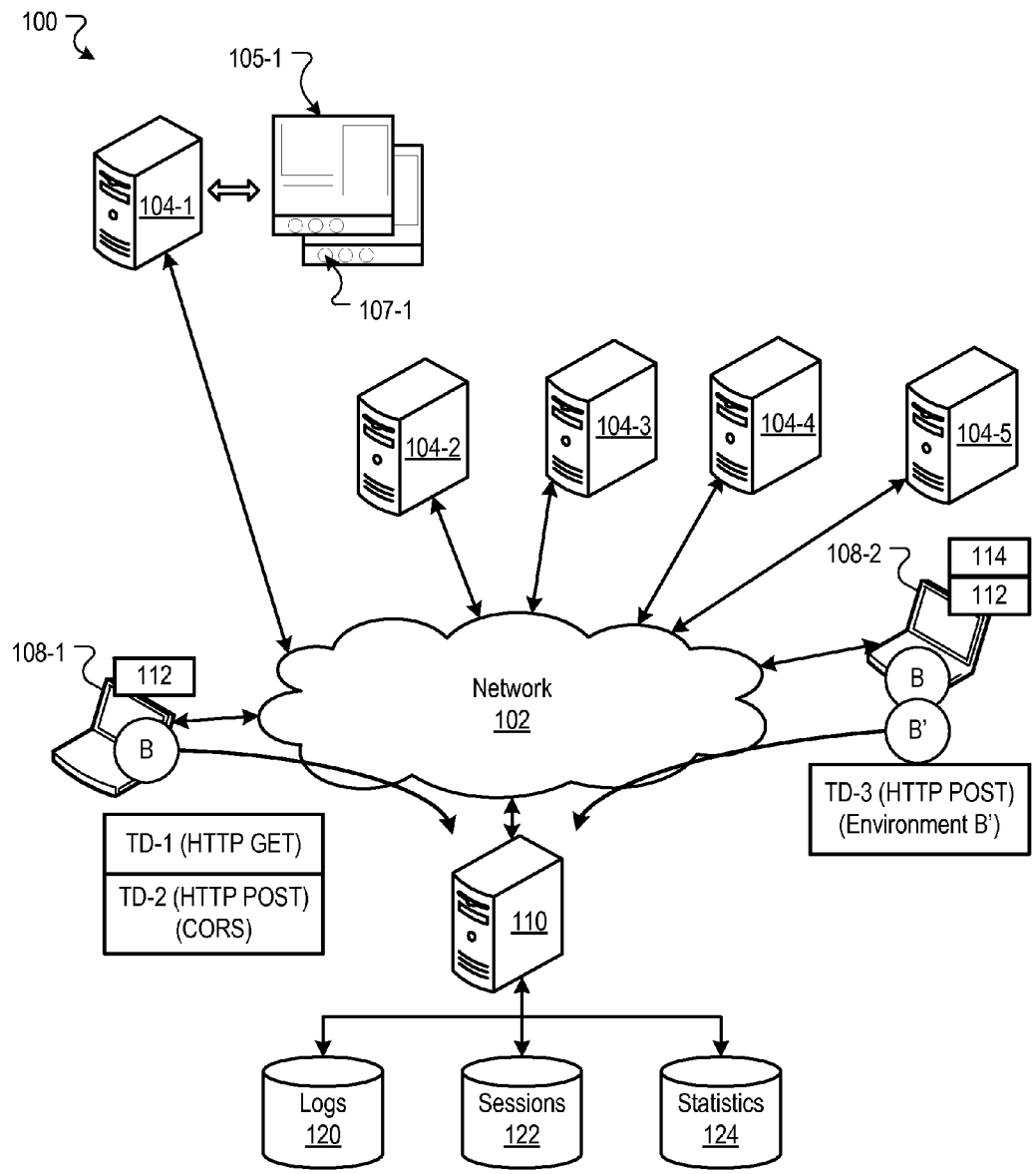
FIG. 1 is a block diagram of an example environment in which tracking data is reported.

FIG. 1 is a block diagram of an example environment 100 in which tracking data communications are reported and processed. A computer network 102, such as the Internet, or a combination of Internet and one or more wired and wireless networks, connects web sites 104-1-104-5, user devices 108-1 and 108-2, and an analytics system 110, such as data processing apparatus that includes a server or many networked servers. Although only five web sites and two user devices are shown, the online environment 100 may include many thousands of web sites and user devices.

A web site 104 is a one or more web page resource 105 associated with a domain name, and each web site is hosted by one or more servers. An example web site is a collection of web pages formatted in hypertext markup language (HTML) that can contain text, graphic images, multimedia content, and programming elements, such as scripts. Each web site 104 is maintained by a publisher, e.g., an entity that manages and/or owns the web site. To avoid congestion in the drawings, only web page resources 105-1 for the web site 104-1 are shown.

A resource is any data that can be provided by the web site 104 over the network 102 and that is associated with a resource address. Resources are addressed by a uniform resource locator (URL). For the purposes herein, the term "web page resource", or simply "web page" or "resource", will be used to describe resources that are accessed through a web browser or similar type of application for display on a user device. Web pages can include HTML or XHTML data, multimedia data, e.g., flash video, images, audio, scripts, and other information and objects that can be presented and executed and/or interpreted in a browser.

A user device, such as one of the devices 108-1 or 108-2, is an electronic device that is under control of a user and is capable of requesting and receiving resources over the network 102. Example user devices 108 include personal computers, e.g., user device 108-1, mobile communication devices, e.g., 108-2, and other devices that can send and receive data over the network 102. A user device 108 typically includes a user application, such as a web browser, to facilitate the sending and receiving of data over the network 102.

The analytics system 110 is implemented with a domain name that defines a domain that is different from the domains of the web sites 104. The publisher of each web site 104 has a corresponding tracking account with which data regarding traffic directed to and from the web site 104 and events related to actions taken by visitors to the web site 104 are associated in the analytics system 110. For example, each of the web pages 105-1 of the web site 104-1 that the publisher desires to track detailed statistics for visitor traffic has embedded within it the tracking instructions 112 described above. When one of the web pages 105-1 is rendered in a browser application on a client device 108, the tracking instructions 112 are executed.

Execution of the tracking instructions 112 enables the user device 108 to provide tracking data communications to the analytics system 110. Example tracking data communication includes an account identifier identifying a tracking account, a visitor identifier identifying a visitor to the web page, an event time, and one or more event statistics. The account identifier is the tracking account number of the web site or web page.

The visitor identifier can, in some implementations, identify a particular user of the user device 108. In some implementations, the visitor information is anonymized for privacy protection. For example, the tracking code can be configured to report only an Internet protocol (IP) address of the user device 108, or can generate a unique random number that is associated with the IP address of the user device 108 or with an identifier of the user. Thus, tracking data for a particular user device are not otherwise associated with or able to identify a particular user. Other anonymization processes, such as hashing, encryption and obfuscation techniques, can also be used to ensure that visitor privacy is protected.

The event time, in some implementations, is a timestamp indicating the time at which the tracking data communication was sent to the analytics system 110. For example, a tracking data communication can be sent each time there is a page request generated by the user device 108. Accordingly, the event time will be the time at which the page request was generated at the user device 108.

Many different event statistics can be reported. For example, a web page can include data specifying which events are to be reported in tracking data communications. Example event statistics that are reported include referrer data identifying the referrer site, the first time the visitor visited the web site, the number of times the visitor has visited the web site, and actions taken at the site (e.g., a link that was clicked on in a web page 105-1, mouse hover events, etc.), campaign data identifying the advertising campaign the visitor came from, registration events notifying the registration of a visitor, visitor selection of web site links, visitor downloading of downloadable content, time between web site activities of the visitor, the visitor's total time on the web site, the visitor entering into a secure session, and other event statistics. The example event statistics listed above are illustrative only, and more or fewer event statistics can be provided.

Historical data related to the visitor is stored in a tracking cookie for the web site 104. For example, when one of the web pages 105-1 is loaded on the user device 108-1, one or more tracking cookies 107-1 for the web site 104-1 are stored in the browser cache on the user device 108-1. The tracking instructions then store historical data for that visitor for the web site 104 in the one or more tracking cookies 107-1 on the user device 108-1. Accordingly, the state of the events, such as the number of visits and the first time the user device 108-1 visited the web site 104-1, can be accurately reported to the analytics system 110.

Accordingly, the size of the tracking data communication reporting the tracking data depends on the events being reported. In some implementations, the size of the tracking data, and the capabilities of the browser application on a client device 108, can be determinative of the message type and process by which the event data are reported.

The tracking data communications received by the analytics system 110 are stored in logs 120. In some implementations, the system 110 accesses logs 120 and identifies account identifier and visitor identifier pairs from the account identifiers and visitor identifiers in the tracking data communications stored in the logs 120. Thereafter, for each identified account and visitor identifier pair, the system 110 orders event statistics by their corresponding event times in the tracking data communications. Using these ordered event statistics for each account and visitor identifier pair, the system 100 determines sessions for each account and visitor identifier pair and stores the information in the sessions data store 122. The event statistics can, in some implementations, be aggregated for each account and visitor identifier pair. The aggregated event statistics are stored in the statistics data store 124 for access by account users. Events stored in the statistics store 124 are typically presented in session/visit reports. Such reports are useful to web sites as they give the publishers insight into the number of visitors to their sites, loyalty for returning visitors, duration of visits, actions performed during their visit, campaign driving traffic to their sites, other sites resulting in a large number of referrals to their sites, and other useful analytics.

Figure 2:
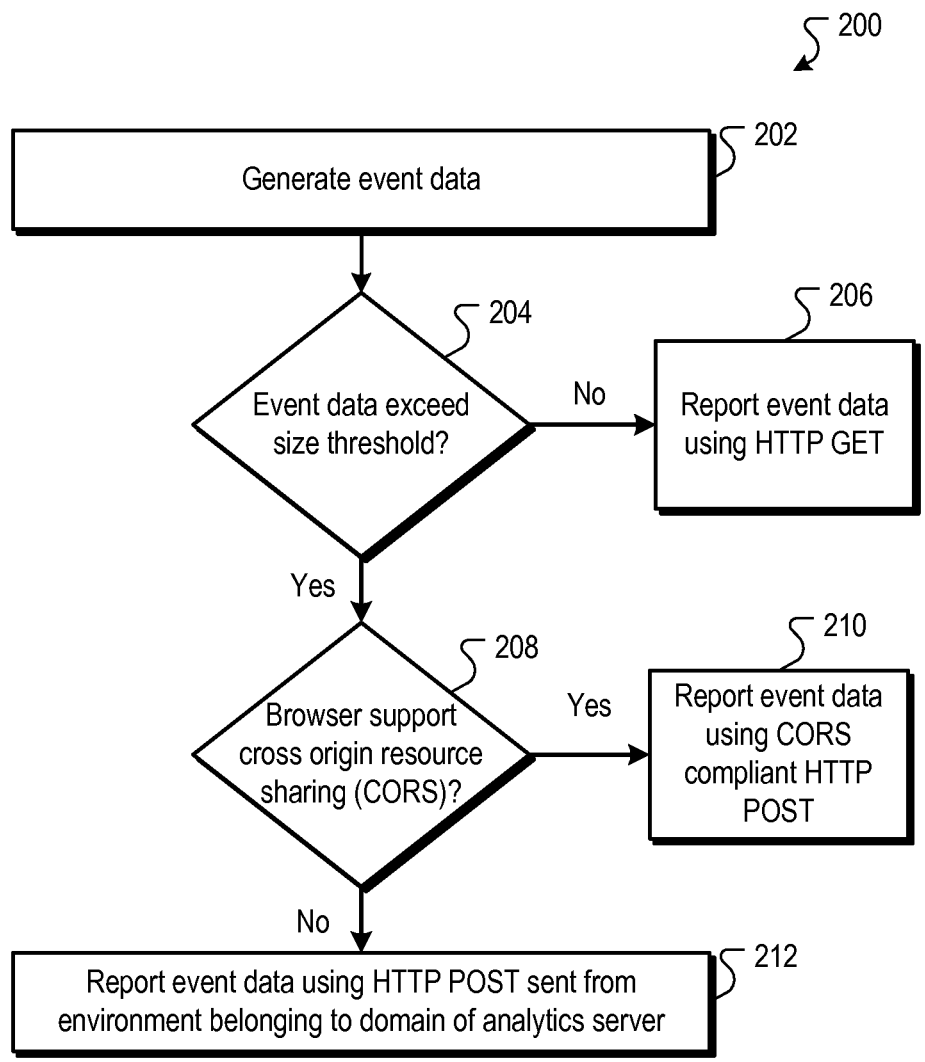
FIG. 2 is a flow diagram of an example process for reporting event data.

FIG. 2 is a flow diagram of an example process 200 for reporting event data. The process 200 can be performed by a client device 108.

The process 200 generates event data (202). For example, the client device, executing the tracking instructions, generates event data as described above. The event data detail one or more events for a web page served by a publisher server and rendered on the client device 108, and the one or more events are measured relative to the client device 108.

The process 200 determines if the event data exceed a size threshold (204). For example, in some implementations, the tracking instructions 112 cause the client device 108 to determine if the event data exceeds a size threshold, e.g., 2048 bytes, or if an HTTP GET request with the encoded event data exceeds 2048 bytes.

If the event data does not exceed the threshold, the process 200 report the event data using an HTTP GET request (206). For example, the tracking data 112 causes the client device to generate an HTTP GET request that includes the event data to the analytics server 110. By way of illustration, the tracking instructions 112 can generate a "gif hit" that sends an HTTP GET request by inserting a single pixel image into the page. The event data for the HTTP GET request are URL encoded and appended as a query string to the image URL. An example HTTP GET that includes encoded event data TD-1 is shown in FIG. 1.

If the process determines that the event data exceeds the size threshold, then the process 200 determines if the browser supports cross origin resource sharing (CORS) (208). For example, the instructions 112 cause the client device 108 to determine if the browser instance B on the client device 108 supports CORS. This can be done, for example, by interrogating the browser type and version, by checking for the presence of a withCredentials property on an XMLHttpRequest object, or for the presence of an XDomainRequest object, or by other processes.

In response to determining that the client supports cross origin resource sharing, the process 200 reports the event data using a CORS compliant HTTP POST request (210). For example, the instructions cause the client 108 to generate an HTTP POST request to the analytics server 110. The HTTP POST includes the event data and is a CORS compliant message, such as a cross-domain AJAX HTTP POST request that is CORS compliant. An example HTTP POST that is CORS compliant and that includes encoded event data TD-2 is shown in FIG. 1.

In response to determining that the client does not support cross origin resource sharing, the process 200 reports event data using an HTTP POST request sent from an environment belonging to the domain of the analytics server (212). For example, the instructions 112 cause the client device 108 to generate an HTTP POST to the analytics server, which includes the event data, and is sent from an environment on the client device 108 that belongs to the second domain, e.g., the browser instance B' for device 108-2.

An environment belongs to a particular domain if it has administrative authority for that domain. Additionally, same-domain environments can programmatically communicate, but such communications are not readily facilitated between cross-domain environments. Because the environments in the same domain as the analytics server 110 do not belong to the domain of the publisher, the publisher processes do not have administrative authority for the environments. Thus the processes of the publisher 105 cannot alter the internal state of the content item environments. This realizes a security measure that makes it more difficult for a publisher or an intervening third party to implement abusive processes (e.g., spamming, false impression reporting) within the environments.

In some implementations, the instructions 112 generate the environment B'. The environment can, for example, be an invisible iFrame, and the name of the iFrame contains the event data to be sent to the analytics server 110. The name attribute of an iFrame can be used to specify event information. The iFrame can, for example, be appended to the web page by defining a new section in the web page and inserting the iFrame into that new section.

The iFrame requests environment instructions (e.g., instructions 114 in FIG. 1) from the server 110, and loads the instructions when they are received. The instructions 114 cause the client device 108 to execute a process within the iFrame that reads the iFrame name, and copies the name into an HTTP POST request (e.g., an AJAX POST) to the analytics server 110.

In some implementations, the initial determination of whether the event data exceeds a size threshold can be omitted, as can the reporting of event data by use of an HTTP get message. These implementations use HTTP post messages, and determine which HTTP post process is supported by the browser. For these alternative implementations, the process 200 being by determining if the browser supports CORS (208).

Figure 3:
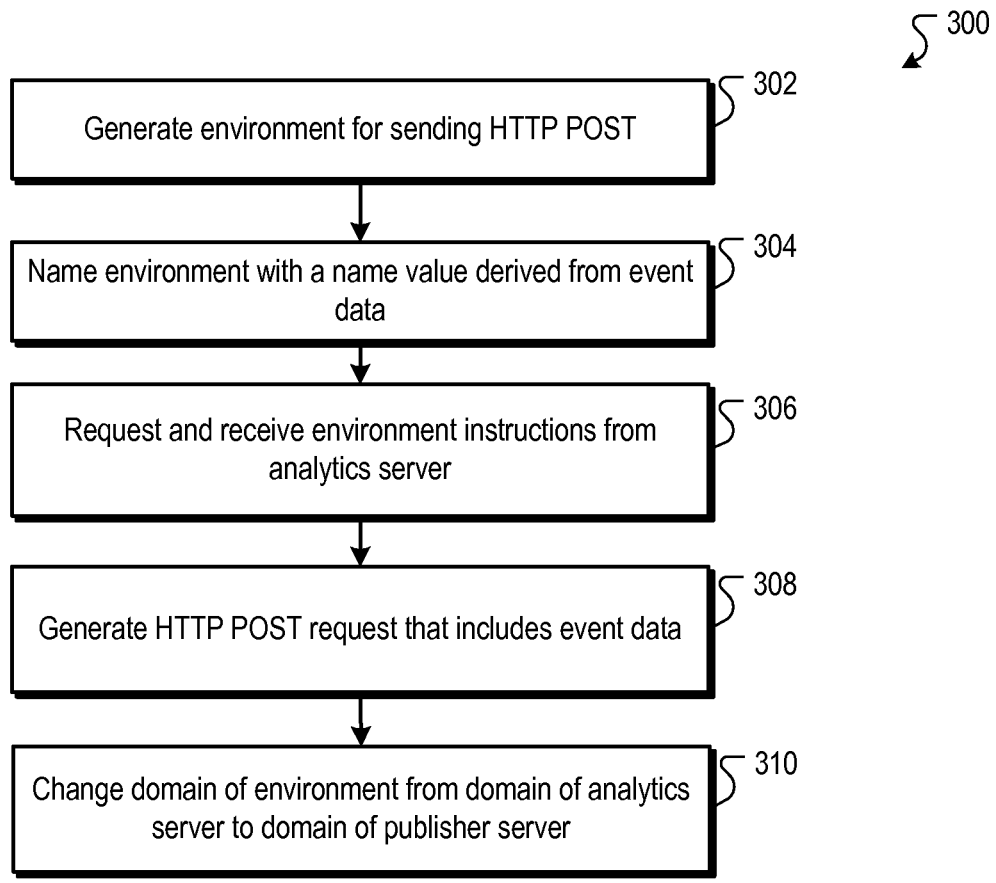
FIG. 3 is a flow diagram of an example process for reporting event data from an environment separate from a web page for which the event data are reported.

The sending of an HTTP post request from an environment belonging to the domain of the analytics server is described in more detail with respect to FIG. 3, which is a flow diagram of an example process 300 for reporting event data from an environment separate from a web page for which the event data are reported.

The process 300 generates an environment for sending an HTTP POST (302). For example, the instructions 112 generate an iFrame.

The process 300 names the environment with a name value derived from the event data (304). For example, the instructions 112 name the iFrame with the event data or a value derived from the event data.

The process 300 requests and receives environment instructions from the analytics server (306). For example, the iFrame requests and receives instructions 114 from the server 110, which are then loaded into the iFrame.

The process 300 generates an HTTP POST request that includes the event data (308). For example, the instructions 114, executing under administrative control of the domain of the server 110, read the name of the iFrame and provide the event data to the server 110 using an HTTP POST request.

The process 300 changes the domain of the environment from the domain of the analytics server to the domain of the publisher server (310). The changing of the domain allows a process belonging to the domain of the web page that is rendered on the client device to close (delete) the iFrame, and also signals that process to close (delete) the iFrame. For example, the instructions 114 can cause the client device 108 to change the domain of the iFrame from the domain of the analytics server 110 to the domain of the publisher 108. The change of the iFrame's domain to that of the publisher 108 is detected by the process belonging to the domain of the web page rendered on the client device and enables that process to close (delete) the iFrame.

In other implementations, the process belonging to the domain of the web page rendered on the client device can monitor for a timeout, and at the end of the timeout can check the title of the iFrame. The instructions 114 change the name value of the iFrame to a uniform resource locator of the domain of the publisher, or, alternatively, changing the name of the iFrame to a predefined value, e.g., "done," and change the location of the iFrame to a page of the domain of publisher 108 so the instructions 112 can read the "done" title. For example, the iFrame can be changed to favicon.ico or blank.html of the publisher 108, provided the publisher hosts these elements. If the name of the iFrame is changed to the predetermined title, the process closes (deletes) the iFrame.

Figure 4:
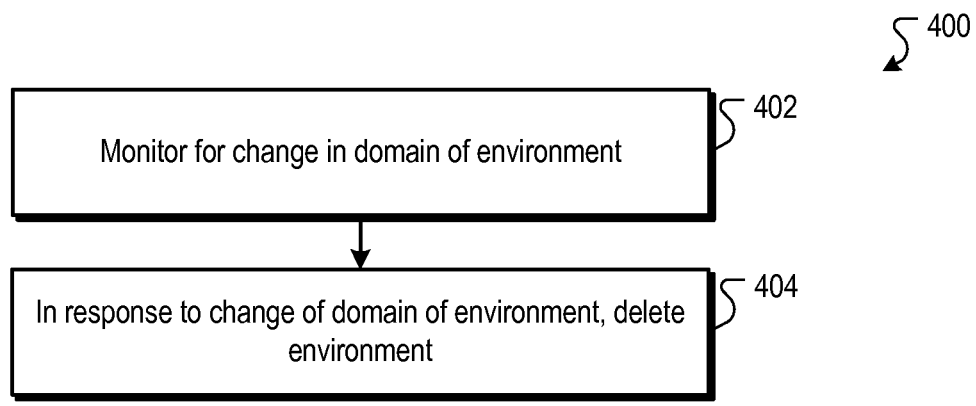
FIG. 4 is a flow diagram of an example process for deleting the environment after the event data are reported.

FIG. 4 is a flow diagram 400 of an example process for deleting the environment after the event data are reported. The process 400 monitors for the change of the domain in an environment (402). For example, the instructions 112 can include a callback function that is executed after a timeout (e.g., 100 milliseconds, or some other timeout). At the execution of the callback, the instructions 112 cause the client device 108 to check if the iFrame's domain is the same as the domain of the web page of the publisher.

In response to a change in the domain of the environment to the domain of the publisher, the process 400 deletes the iFrame (404). For example, if the domains are the same, the client device can delete the iFrame.

As described above, the size of the event data can vary, depending on the events that occur. In some implementations, before the event data are sent, the instructions 112 cause the client device to determine if the size of the event data exceeds a maximum size. The maximum size is an upper size limit of the event data that the server 110 will accept by an HTTP POST. If the event data exceeds the maximum size, then the client device does not report the event data. In variations of this implementation, the instructions 112 cause the client device to send an error message to the server 110. The error message indicates that the event data were dropped from reporting due to excessive size. In still other variations of this implementation, the instructions 112 cause the client device to truncate the event data to the maximum size and send the event data by the appropriate POST method.

In still other implementations, if the event data exceeds the maximum size, then the client device, as instructed by the instructions 114, provides two or more HTTP posts, and the system 110 consolidates the reported event data upon receipt of the two or more HTTP posts.

Although the examples above are described in the context of web site analytics, the data delivery processes described above can be used to provide many different types of data for many different applications. For example, instead of event data, the data that is transmitted can be any transmission data for a web page served by a first server that belongs to a first domain and that is rendered on the client device. Instead of an analytics server, the server to which the transmission data are sent is a receiving server that belongs to a second domain.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 5:
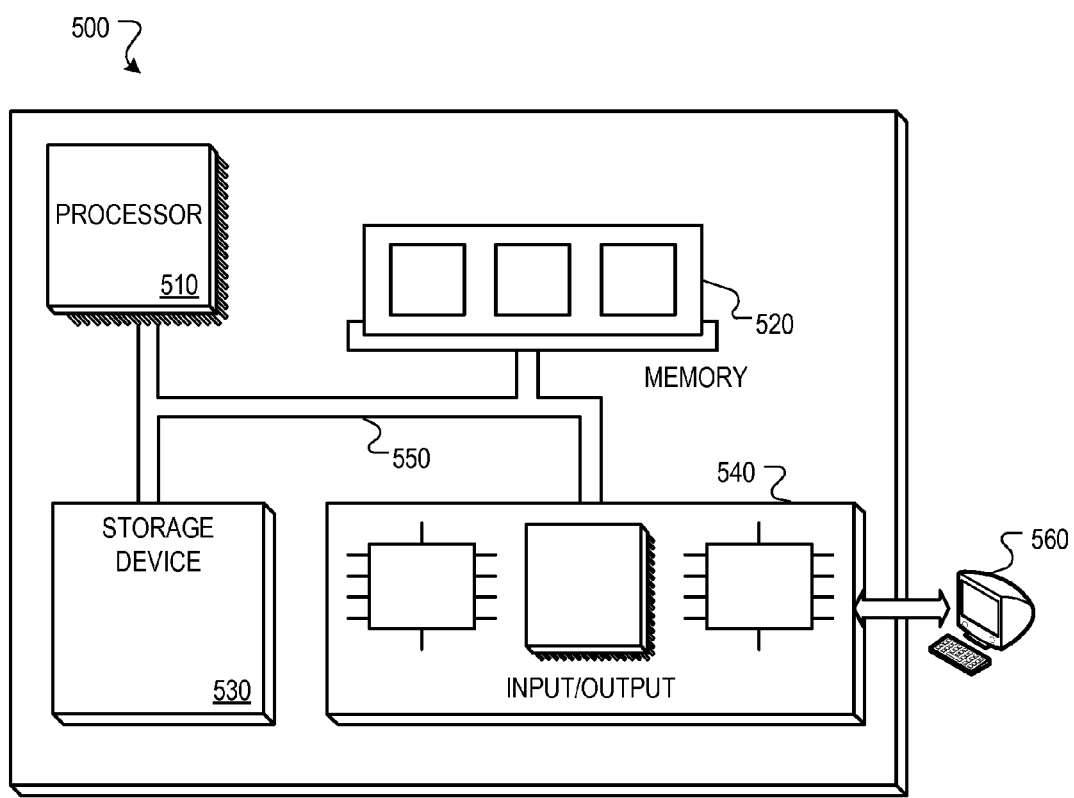
FIG. 5 is a block diagram of a programmable processing system.

An example of one such type of computer is shown in FIG. 5, which shows a block diagram of a programmable processing system (system). The system 500 that can be utilized to implement the systems and methods described herein. The architecture of the system 500 can, for example, be used to implement a computer client, a computer server, or some other computer device.

The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more of a network interface device, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 560.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    generating event data specifying one or more events for a web page served by a publisher server and rendered on the client device, the web page and publisher belonging to a first domain;
    determining that the event data exceeds a size threshold;
    determining that the client device does not support cross origin resource sharing of the event data with an analytics server that belongs to a second domain that differs from the first domain; and
    in response to determining that the event data exceeds a size threshold and that the client device does not support cross origin resource sharing with the analytics server:
        generating an HTTP POST request that includes the event data and includes;
            defining an iFrame for the web page, the iFrame belonging to the second domain and the iFrame having a name value derived from the analytics server;
            issuing a request from the iFrame for environment instructions from the analytics server; and
            receiving the environment instructions from the analytics server and executing the environment instructions in the iFrame, the environment instructions causing the client device to generate the HTTP POST request; and
        outputting the HTTP POST request through an environment on the client device that has at least administrative authority to access the second domain to deliver the event data to the analytics server.

2. The method of claim 1, wherein generating the HTTP POST request to the analytics server comprises generating the output of the HTTP Post request from a web page of the environment.

3. The method of claim 1, further comprising:
    determining that the iFrame name value includes a uniform resource locator for the first domain; and
    in response to determining that the iFrame name value includes a uniform resource locator for the first domain, deleting the iFrame.

4. The method of claim 1, wherein generating the HTTP POST request to the analytics server comprises:
    generating the environment with a name value;
    requesting, from the environment, environment instructions from the analytics server;
    receiving the environment instructions from the analytics server; and
    executing the environment instructions in the environment, the environment instructions causing the client device to generate the HTTP POST request to the analytics server.

5. The method of claim 4, wherein the environment instructions further cause the client device to perform operations comprising changing the domain of the environment from the second domain to the first domain.

6. The method of claim 5, further comprising deleting the environment in response to the changing of the domain of the environment.

7. The method of claim 5, wherein changing the domain of the environment from the second domain to the first domain comprises assigning the name value of the environment to a uniform resource locator of the first domain.

8. A non-transitory computer storage medium encoded with instructions that when executed by a client device cause the client device to perform operations comprising:
   generating event data specifying one or more events for a web page served by a publisher server and rendered on the client device, the web page and publisher belonging to a first domain;
   determining that the event data exceeds a size threshold;
   determining that the client device does not support cross origin resource sharing of the event data with an analytics server that belongs to a second domain that differs from the first domain; and
   in response to determining that the event data exceeds a size threshold and that the client device does not support cross origin resource sharing with the analytics server:
      generating an HTTP POST request that includes the event data and includes;
         defining an iFrame for the web page, the iFrame belonging to the second domain and the iFrame having a name value derived from the analytics server;
         issuing a request from the iFrame for environment instructions from the analytics server; and
         receiving the environment instructions from the analytics server and executing the environment instructions in the iFrame, the environment instructions causing the client device to generate the HTTP POST request; and
      outputting the HTTP POST request through an environment on the client device that has at least administrative authority to access the second domain to deliver the event data to the analytics server.

9. The non-transitory computer storage medium of claim 8, wherein the instructions further cause the client device to perform operations comprising:
   determining that the iFrame name value includes a uniform resource locator for the first domain; and
   in response to determining that the iFrame name value includes a uniform resource locator for the first domain, deleting the iFrame.

10. A system comprising:
   a processing apparatus;
   a memory storage apparatus in data communication with the data processing apparatus, the memory storage apparatus storing instructions executable by the data processing apparatus and that upon such execution cause the data processing apparatus to perform operations comprising:
      generating event data specifying one or more events for a web page served by a publisher server and rendered on the client device, the web page and publisher belonging to a first domain;
      determining that the event data exceeds a size threshold;
      determining that the client device does not support cross origin resource sharing of the event data with an analytics server that belongs to a second domain that differs from the first domain; and
      in response to determining that the event data exceeds a size threshold and that the client device does not support cross origin resource sharing with the analytics server:
         generating an HTTP POST request that includes the event data and includes;
            defining an iFrame for the web page, the iFrame belonging to the second domain and the iFrame having a name value derived from the analytics server;
            issuing a request from the iFrame for environment instructions from the analytics server; and
            receiving the environment instructions from the analytics server and executing the environment instructions in the iFrame, the environment instructions causing the client device to generate the HTTP POST request; and
         outputting the HTTP POST request through an environment on the client device that has at least administrative authority to access the second domain to deliver the event data to the analytics server.

11. The system of claim 10, wherein generating the HTTP POST request to the analytics server comprises generating the output of the HTTP POST request from a web page of the environment.

12. The system of claim 10, wherein generating the HTTP POST request to the analytics server comprises:
   defining an iFrame for the web page, the iFrame belonging to the second domain and the iFrame having a name value derived from the analytics server;
   issuing a request from the iFrame for environment instructions from the analytics server; and
   receiving the environment instructions from the analytics server and executing the environment instructions in the iFrame, the environment instructions causing the client device to generate the HTTP POST request to the analytics server.

13. The system of claim 10, wherein the instructions further cause the client device to perform operations comprising:
   determining that the iFrame name value includes a uniform resource locator for the first domain; and
   in response to determining that the iFrame name value includes a uniform resource locator for the first domain, deleting the iFrame.

14. The system of claim 10, wherein generating the HTTP POST request to the analytics server comprises:
   generating the environment with a name value;
   requesting, from the environment, environment instructions from the analytics server;
   receiving the environment instructions from the analytics server; and
   executing the environment instructions in the environment, the environment instructions causing the client device to generate the HTTP POST request to the analytics server.

15. The system of claim 14, wherein the environment instructions further cause the client device to perform operations comprising changing the domain of the environment from the second domain to the first domain.

16. The system of claim 15, wherein the instructions further cause the client device to perform operations comprising deleting the environment in response to the changing of the domain of the environment.

17. The system of claim 15, wherein changing the domain of the environment from the second domain to the first domain comprises assigning the name value of the environment to a uniform resource locator of the first domain.

* * * * *